May 20, 1958 R. W. ALLEN 2,835,731

DOUBLE CHANNEL PULSE AMPLIFIER

Filed July 31, 1951 2 Sheets-Sheet 1

INVENTOR
Richard W. Allen
BY
Charles H. Brown
ATTORNEY

DOUBLE CHANNEL PULSE AMPLIFIER

INVENTOR
Richard W. Allen
BY
Charles H. Brown
ATTORNEY

United States Patent Office 2,835,731
Patented May 20, 1958

2,835,731

DOUBLE CHANNEL PULSE AMPLIFIER

Richard W. Allen, Moorestown, N. J., assignor, by mesne assignments, to the United States of America as represented by the Secretary of the Air Force Application July 31, 1951, Serial No. 239,434
1 Claim. (Cl. 178—7.1)

Figure 1:
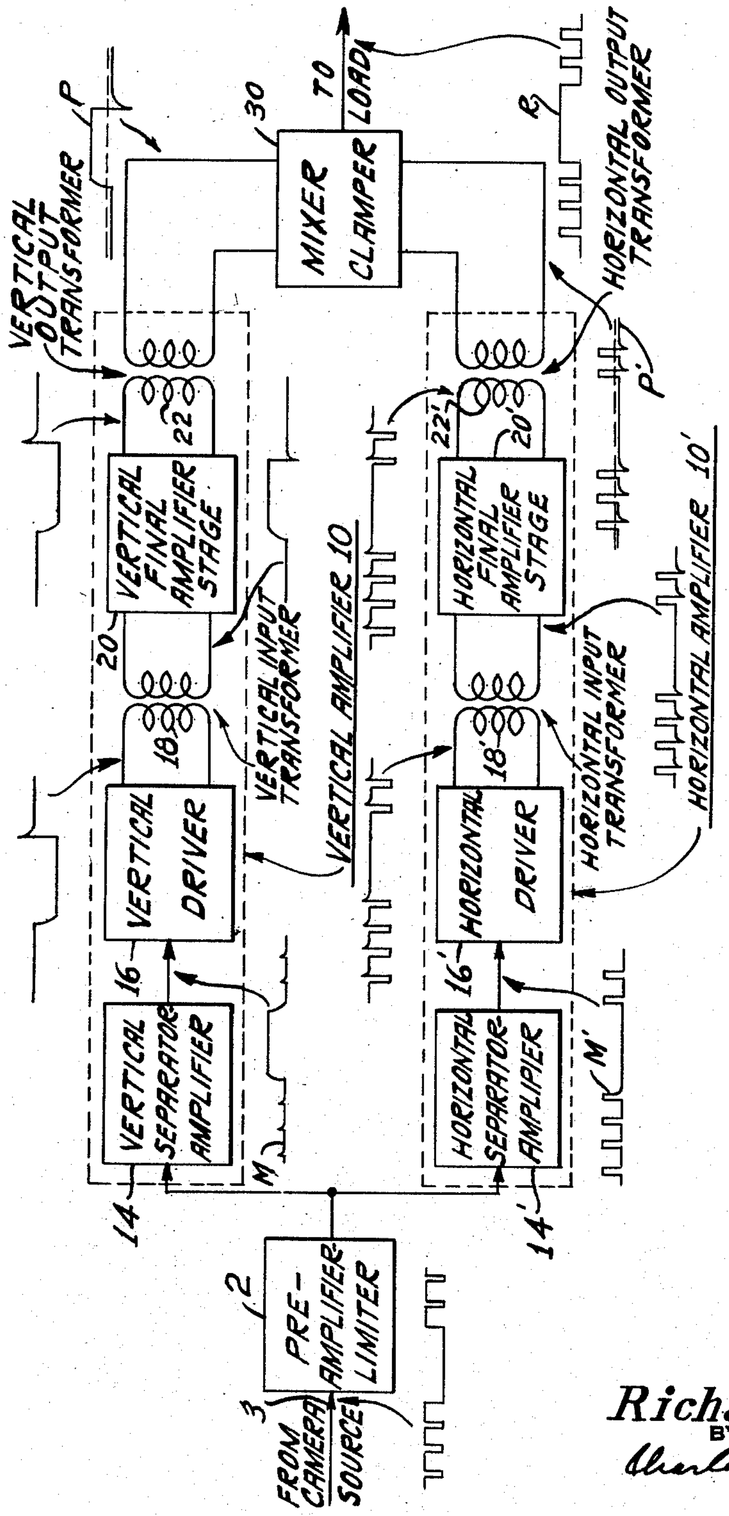

The present invention relates to television systems, and more particularly to an improved method of any means for amplifying the vertical and horizontal synchronizing pulses emanating from the camera equipment for the modulation of a television transmitter.

In accordance with present television practice, both video and synchronizing signal components are employed to modulate a carrier wave. For brevity and convenience, the term "synchronizing" may hereinafter be referred to by its abbreviation "sync." In each instant, however, the meaning imparted by the term used is to be the same. The video components, representative of the light and shadow values of the image being transmitted, modulate the carrier wave during the scanning, or trace, intervals of the scanning cathode ray beam which is developed within the camera tube of the now well-known electronic type of television system. The sync components, on the other hand, modulate the carrier wave during the so called beam retrace or return line periods or, in other words, during the time that the cathode ray scanning beam is being returned from one extreme position following one line or field scanning for the start of another line-scanning, or field-scanning, operation. These sync components of the signal occur during so-called "blanking periods" when the outgoing signal is made representative of black in the image, according to a preferred method.

The receiving apparatus which becomes responsive to such signals customarily incorporates an image-reproducing tube within which a cathode ray beam is developed and deflected to scan a luminescent target or screen to develop thereon luminous effects. The video components of the composite television signal, by controlling the intensity of the beam, determine, in well-known manner, the instantaneous degree of illumination of each elemental area of the target. The sync components of the received television signal control the deflection of the beam, so that it will scan the image raster area of the luminescent target in line-by-line synchronism with the operation of the scanning beam developed within the camera tube at the transmitter. Since negative picture transmission, whereby maximum video amplitude corresponds to a black elemental area, is to be preferred to provide best overall operation, and since the sync impulses are transmitted at maximum transmitter carrier amplitude and thus representative of "ultra black" (that is, "blacker than black"), the sync components of the transmitted signal suppress the beam of the image reproducing tube during the time they appear. In this manner, a reconstruction of the transmitted image is brought about in a generally known manner.

The sync components of the composite television signal consist of substantially rectangular pulses. While the amplitude of all the pulses is equal, they vary in width or time duration, those which are transmitted during vertical retrace, that is, at the end of each field-scanning operation, being of greater width than those which are transmitted during horizontal retrace, that is, at the end of each line-scanning interval. The frequency of the line or horizontal sync pulses is much higher than that of the frame or vertical sync pulses. For example, the line frequency may be 14,000 pulses per second and the frame frequency 40 pulses per second. The vertical and horizontal sync pulses are normally generated and combined in the camera. The vertical pulses are relatively long in duration and low in frequency or repetition rate, and the horizontal pulses are relatively short in duration and high in frequency.

It is sometime necessary in arrangements such as the above to amplify the combined pulses to obtain the amplitude required to plate modulate the transmitter with a signal of relatively positive polarity. Additionally, if the transmitter is to be airborne, the amplifier and the associated power supplies must be of minimum weight and volume. One known way of obtaining the necessary modulating voltage is to amplify the combined sync signals generated in the camera by well known amplifier means. To obtain a pulse of sufficient amplitude having positive polarity necessitates operating the final amplifier stage tubes under normally conducting rather than non-conducting conditions. This compels the use of relatively large power supplies and tubes having correspondingly higher plate dissipation values. To operate the final amplifier stage tubes under normally non-conducting conditions would compel the driver to be normally conducting to supply the requisite positive pulse to the input of the final amplifier stage and the output of the final amplifier stage would be in the form of the undesired negative pulse. If the driver or final amplifier stage is operated as a cathode follower, and therefore under non-conducting conditions, it would compel a much larger input thereby shifting the same problem to the prior stage. The use of transformers to invert the pulses at the appropriate stages is not the solution since a transformer has not been designed, it is believed, which can satisfactorily pass the two diverse sync pulse frequencies involved.

One object of the present invention, therefore, is to provide an improved method of and means for amplifying pulse trains having appreciably different repetition rates.

A further object is to provide apparatus for amplifying the combined vertical and horizontal sync signals utilizing available transformers and reducing volume, weight, and power requirements, irrespective of the polarity of the output signal desired.

The invention is hereinafter described by way of example only, in connection with apparatus for plate modulating an airborne television transmitter with a positively polarized sync pulse signal. The combined horizontal and vertical sync pulses are received from the camera source, separated into the respective horizontal and vertical sync components, and amplified separately in different amplifiers. The final amplifier stage of each separate amplifier is operated with plate and screen currents normally cut off by utilizing transformer coupling and inverting the pulse signal where necessary. Each driver of the corresponding final amplifier stage is similarly operated with the plate current normally cut off. The separately amplified vertical and horizontal pulse components are then recombined to produce the combined amplified sync pulse signal. The use of this novel method results in a reduction in power consumption of more than sixty percent over the power consumption of the method commonly used in the prior art, and concomitant savings in space requirements.

Figure 2:
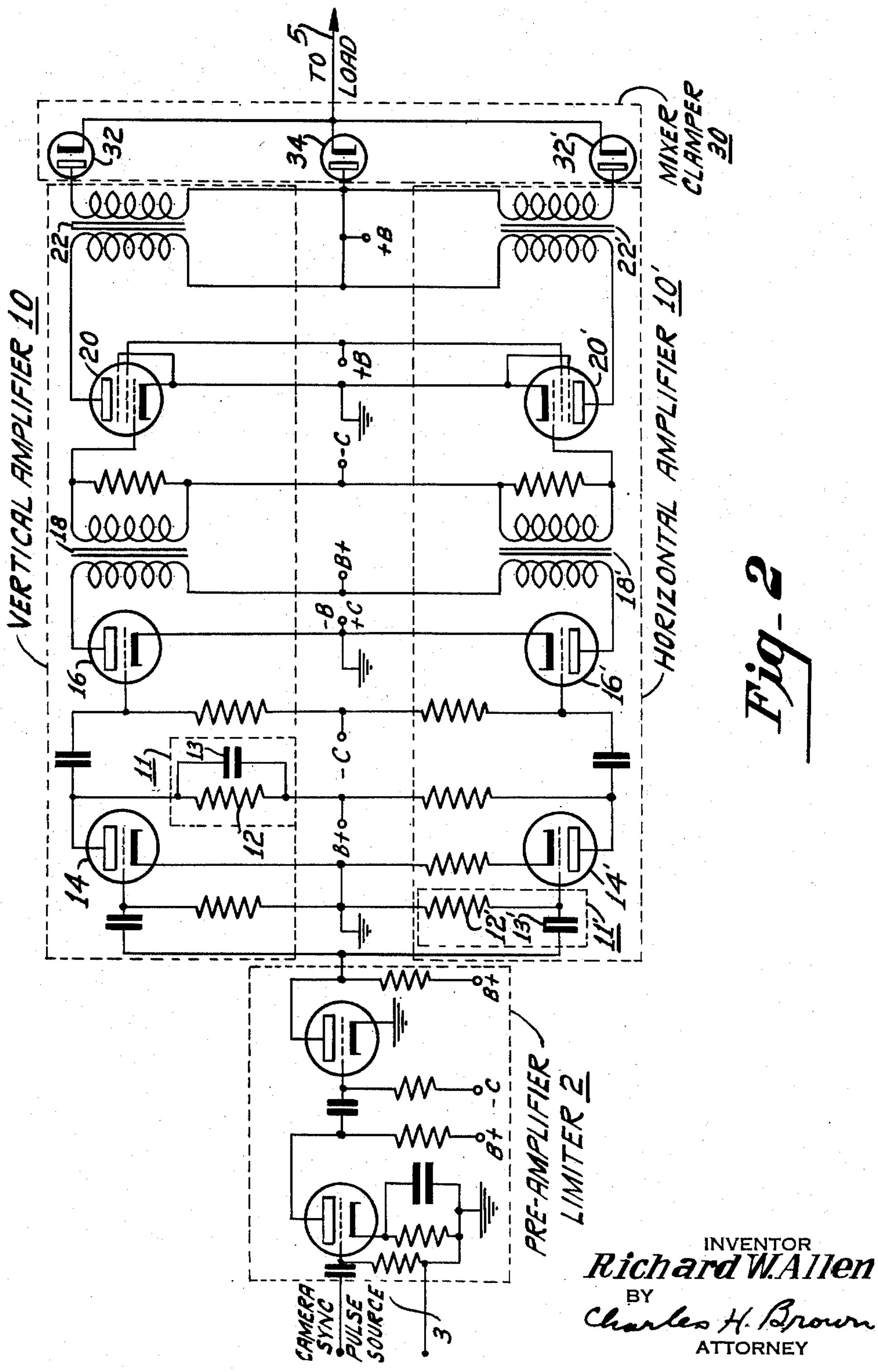

Other objects, features and advantages will appear in the subsequent detailed description which is accompanied by drawings wherein:

Fig. 1 is a block diagram of an amplifying system whose output may be used for modulating a transmitter, in accordance with a preferred embodiment of the present invention; and Fig. 2 is a circuit diagram of the system of Fig. 1 showing the details thereof.

Referring more particularly to the amplifying system of Fig. 1, there is illustrated a pre-amplifier-limiter 2, a vertical amplifier 10 shown by the upper dash line box, a horizontal amplifier 10′ shown by the lower dash line box, and a mixer-clamper 30. The combined vertical and horizontal sync pulse signals having negative polarity are received over lead 3 from the camera source, not shown, by the pre-amplifier-limiter 2, which pre-amplifies the weaker pulse signals and limits the stronger pulse signals. The negatively polarized output of the pre-amplifier-limiter 2 comprising the combined vertical and horizontal sync signals is applied both to the vertical separator-amplifier 14 (the first stage of the vertical amplifier 10) and to the horizontal separator-amplifier 14′ (the first stage of the horizontal amplifier 10′). Separator-amplifiers 14 and 14′ respectively separate the corresponding vertical and horizontal sync components from the combined sync signal. A vertical driver 16 is coupled to the vertical separator-amplifier 14 to amplify the positively polarized vertical sync component in the output of said vertical separator-amplifier 14. The vertical input transformer 18 coupled to the output of the vertical driver inverts the negatively polarized pulses in the output of the vertical driver 16, thereby driving the vertical final amplifier stage 20 with a positively polarized vertical component. The vertical final amplifier stage 20 further amplifies the applied vertical pulses. The negatively polarized output of the vertical final amplifier stage 20 is inverted by the output transformer 22 coupled to the vertical final amplifier stage 20 to produce the desired positively polarized pulse signal. The horizontal sync amplifier 10′ functions in a similar manner in respect to the horizontal component, the resulting positively polarized output appearing across the secondary of the horizontal output transformer 22′. The vertical and horizontal drivers 16 and 16′ and final amplifier stages 20 and 20′ are non-conducting between pulses and are driven with positively polarized pulses. A mixer-clamper 30 is coupled to the secondaries of the vertical and horizontal output transformers 22 and 22′ to combine the amplified positively polarized vertical and horizontal sync components and to clamp the output of the amplifier system at a predetermined level during no-pulse signal conditions.

The voltage variations appearing in the different circuit connections are graphically illustrated by the waveforms appearing immediately above or below such connections.

A description of the operation of the apparatus as illustrated in the detailed circuit diagram of Fig. 2 follows:

The sync signal, comprising the horizontal and vertical sync components having negative polarity and having repetition rates respectively of the order of 14,000 pulses per second and 40 pulses per second, is applied to the pre-amplifier-limiter 2 from the camera sync pulse source. The pre-amplifier-limiter 2 is composed of a pair of evacuated electron discharge devices and associated circuit arranged to amplify any pulse signal the amplitude of which falls below a predetermined level, and to limit the amplitude of any pulse signal which is of a larger amplitude than another predetermined level. This results in a substantially constant level output from the pre-amplifier-limiter 2, removing the necessity for a manual gain control. The output from the pre-amplifier-limiter 2, of negative polarity as a result of the two stage operation, is fed jointly to the inputs of vertical amplifier 10 and the horizontal amplifier 10′.

The first stage of the vertical amplifier 10, that is, vertical separator-amplifier 14, receives the combined vertical and horizontal sync signal. An integration network 11 in the plate circuit of the vertical separator-amplifier 14 functions to partially separate the vertical sync component from the combined sync signal since the time constant of resistor 12 and condenser 13 of the network 11 is so chosen as to fully respond to the lower frequency vertical sync pulses only. Consequently, the output of the vertical separator-amplifier 14 comprises positive pulses of a substantial amplitude representative of the vertical sync input to the vertical separator-amplifier 14, and positive pulses of a much smaller amplitude representative of the horizontal sync input to the vertical separator-amplifier 14 as illustrated by the waveform M in Fig. 1. The vertical driver 16 is coupled to the vertical separator-amplifier 14 and biased such that the plate current is normally cut off except when the larger amplitude vertical sync pulses excite said vertical driver 16 causing the plate to draw current. The voltage swing representative of the vertical sync component thereby appears across the primary of the vertical input transformer 18 with negative polarity whenever the driver conducts. The vertical input transformer 18 inverts the polarity of the vertical pulses to drive with a positively polarized signal the vertical final amplifier stage 20, whose input is coupled to the secondary of the vertical input transformer 18. This enables the heavy duty vertical final amplifier stage 20 to be biased so that no plate and screen currents will flow except when a vertical sync pulse is present. The pulse output of the vertical final amplifier stage 20, present whenever stage 20 conducts, appears across the primary of the vertical output transformer 22 with negative polarity and the said vertical output transformer 22 inverts the signal to produce the desired positively polarized vertical sync component across the secondary of the said vertical output transformer 22. The vertical input and output transformers 18 and 22 are designed to be primarily responsive to the repetition rate of the vertical sync pulses only, thereby substantially removing any remaining portion of the horizontal sync component.

Horizontal amplifier 10′ is similar to vertical amplifier 10, and corresponding parts of the former are designated by the same reference numerals as in vertical amplifier 10, but with prime designations added. The horizontal amplifier 10′ functions in a similar manner on the horizontal sync component as the vertical amplifier functions on the vertical component except that the horizontal component is separated from the combined sync signal by the use of the differentiating network 11′ in the grid circuit of the horizontal-separator amplifier 14′, the time constant of the resistor 12′ and the condenser 13′ being chosen such that only the higher frequency horizontal pulse of short duration will pass without a substantial reduction in amplitude as shown by the waveform M′ of Fig. 1. The horizontal input and output transformers 18′ and 22′, designed to function at the horizontal sync pulse frequency, substantially remove any remaining portion of the vertical component.

Since separation of the two sync components allows for full and efficient utilization of transformer coupling and, thereby, provision for inverting pulse polarity, the drivers and heavy duty final amplifier stages are operated normally non-conducting with a corresponding saving in space requirements because of the reduction in power consumption and required plate dissipation values.

The outputs of the vertical and horizontal amplifiers 10 and 10′ represented by waveforms P and P′ respectively are mixed in the mixer-clamper 30 which comprises a vertical mixer-diode tube 32, a horizontal mixer-diode tube 32′, and a clamper-diode tube 34. Between pulses the current flowing thru the load divides up among the three diodes. When a positively polarized vertical pulse appears across the secondary of the vertical output transformer 22, the plate voltage on the vertical mixer-diode 32 is increased an amount equal to the voltage amplitude of said pulse. Since the internal resistance of the vertical mixer-diode 32 is relatively low, this increase in voltage is reflected across the cathode of the said vertical mixer-diode 32. As the three cathodes of the three diodes 32, 34 and 32′ are interconnected, the plate currents of the clamper-diode 34 and horizontal mixer-diode 32′ are cut off, the cathodes of clamper-diode 34 and horizontal mixer-diode 32′ having a higher potential than their respective plates since the increased plate voltage on said vertical mixer-diode 32 is reflected on the interconnected cathodes of the diodes 32′ and 34. Consequently the vertical mixer-diode 32 will carry the full load current on vertical pulse peaks. Since the utilization of the transformer 22 results in inherently A. C. coupling, a negative component of the positively polarized pulse also appears across the secondary of the vertical output transformer 22 as indicated by waveform P in Fig. 1. This functions to lower the plate potential of the vertical mixer-diode 32 below its cathode potential, cutting off the current in said diode. Consequently, the total load current is carried by the clamper-diode 34 and the horizontal mixed-diode 32′ and the negative swing does not appear across the load, not shown, the load current being clamped at a predetermined level between pulses and during negative swings, the level depending on the circuit constants. The horizontal mixer-diode 32′ functions in a similar manner during horizontal pulses as the mixer-diode 32 functions during vertical sync pulses. Therefore, the amplified vertical and horizontal sync pulse components are recombined to form the amplified sync signal, represented by waveform R, having the necessary positive polarity and amplitude to plate modulate the television transmitter, not shown but coupled to lead 5. Lead 5 may be connected to the plate of the radio frequency final amplifier stage of the transmitter. The final amplifier stages 20 and 20′, and the drivers 16 and 16′ are thus operated normally non-conducting to greatly reduce total power consumption, plate dissipations, and space requirements. The invention is therefore particularly useful in airborne television transmitting equipment where the saving of space and power is important. By way of comparison to amplify a pulse with a 1 to 2 volt peak to peak swing to a pulse of 400 volt peak to peak swing, the conventional known circuit may occupy 264 cubic inches and require power of 333 watts, whereas the system of the invention will achieve the same results with apparatus occupying only 157 cubic inches of space and requiring only 122 watts of power.

What is claimed is:

In a television transmitter having a source of a synchronizing signal consisting of horizontal synchronizing pulses and vertical synchronizing pulses, the horizontal pulses having a shorter duration and a higher repetition rate than the vertical pulses, a first amplifier means coupled to said source, main amplifying means comprising two branches coupled to said first amplifier, a horizontal separator-amplifier including a differentiator in one of said branches and a vertical separator-amplifier including an integrator in the other branch, said differentiator comprising the input of said horizontal separator-amplifier and having a time constant to translate said horizontal pulses to pulses of substantially equal duration and to translate said vertical pulses to short duration pulses occurring at the leading edges of the respective ones of said vertical pulses, said integrator comprising the output of said vertical separator-amplifier and having a time constant to translate said horizontal pulses to pulses of negligible amplitude and to translate said vertical pulses to long duration pulses of substantially the same initial amplitude, whereby the differentiator discriminates against the vertical pulses and the integrator discriminates against the horizontal pulses, separate driver stages coupled to the outputs of the horizontal separator-amplifier and the vertical separator-amplifier for amplifying said respective pulses, separate final amplifiers transformer coupled to the outputs of said driver stages for further amplifying said respective pulses, and mixer means connected to said final amplifiers to combine the outputs of said final amplifiers.

References Cited in the file of this patent

UNITED STATES PATENTS

| | | |
|---|---|---|
| 2,236,066 | Poch | Mar. 25, 1941 |
| 2,379,739 | Norton | July 3, 1945 |
| 2,489,297 | Labin et al. | Nov. 29, 1949 |
| 2,490,561 | Ussler | Dec. 6, 1949 |
| 2,493,648 | Watton et al. | Jan. 3, 1950 |
| 2,570,431 | Crosby | Oct. 9, 1951 |